United States Patent
Kuwahara et al.

(10) Patent No.: US 7,953,534 B2
(45) Date of Patent: May 31, 2011

(54) VEHICLE INTEGRATED-CONTROL APPARATUS AND VEHICLE INTEGRATED-CONTROL METHOD

(75) Inventors: Seiji Kuwahara, Toyota (JP); Masato Kaigawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1034 days.

(21) Appl. No.: 11/791,993

(22) PCT Filed: Apr. 24, 2006

(86) PCT No.: PCT/IB2006/000977
§ 371 (c)(1),
(2), (4) Date: May 31, 2007

(87) PCT Pub. No.: WO2006/114679
PCT Pub. Date: Nov. 2, 2006

(65) Prior Publication Data
US 2008/0015755 A1    Jan. 17, 2008

(30) Foreign Application Priority Data

Apr. 25, 2005    (JP) .................................. 2005-126809

(51) Int. Cl.
*F16H 61/06* (2006.01)
*G06F 19/00* (2006.01)
(52) U.S. Cl. .............. 701/53; 701/55; 701/87; 477/139; 477/148; 477/84

(58) Field of Classification Search .................... 701/70, 701/91, 84, 48, 45, 33, 54, 51, 87, 79, 53, 701/55, 56; 180/79.1, 197; 477/97, 110, 477/34, 37, 138, 139, 148, 68, 84; 74/866, 74/861
See application file for complete search history.

(56) References Cited

U.S. PATENT DOCUMENTS

| 5,161,432 A | * | 11/1992 | Matsumoto et al. | .......... 477/119 |
| 5,351,776 A | * | 10/1994 | Keller et al. | .................... 701/70 |
| 6,220,987 B1 | * | 4/2001 | Robichaux et al. | ............. 477/97 |
| 6,553,297 B2 | * | 4/2003 | Tashiro et al. | .................. 701/48 |
| 7,412,317 B2 | * | 8/2008 | Takamatsu et al. | ............ 701/70 |
| 2003/0225494 A1 | | 12/2003 | Coelingh et al. | |
| 2004/0034460 A1 | * | 2/2004 | Folkerts et al. | ................. 701/54 |

FOREIGN PATENT DOCUMENTS

| DE | 41 11 023 A1 | 10/1992 |
| DE | 101 17 162 A1 | 10/2002 |
| DE | 103 03 461 A1 | 9/2003 |

(Continued)

*Primary Examiner* — Ronnie Mancho
(74) *Attorney, Agent, or Firm* — Oliff & Berridge, PLC

(57) ABSTRACT

The invention relates to a vehicle integrated-control apparatus and method that sets a final control target by coordinating a control target primarily set based on an input of a driver with instruction values from the control systems; and that causes a drive control system to control a drive source and a stepped automatic transmission to achieve the final control target. With this apparatus and method, at least one of the control systems, which provide instruction values to be coordinated with the primarily set control target, is notified of a range of control targets that can be achieved at a current shift speed; a range of control targets that can be achieved by changing the current shift speed to a currently achievable shift speed; and a range of control targets that can be achieved without changing the current shift speed to another shift speed.

13 Claims, 6 Drawing Sheets

FOREIGN PATENT DOCUMENTS

| | | |
|---|---|---|
| EP | 1 369 287 A2 | 12/2003 |
| JP | A 5-85228 | 4/1993 |
| JP | A-11-343891 | 12/1999 |
| WO | WO 2005/062274 A2 | 7/2005 |

* cited by examiner

VEHICLE INTEGRATED-CONTROL APPARATUS AND VEHICLE INTEGRATED-CONTROL METHOD

INCORPORATION BY REFERENCE

The disclosure of Japanese Patent Application No. 2005-126809 filed on Apr. 25, 2005, including the specification, drawings, and abstract is incorporated herein by reference in its entirety.

BACKGROUND OF THE INVENTION

1. Field of the Invention

The invention relates to a vehicle integrated-control apparatus and method which is employed in a vehicle including a drive source, and a stepped automatic transmission that is connected to the drive source and that changes the speed ratio in a stepwise manner. The vehicle integrated-control apparatus and method sets the final control target by coordinating the control target primarily set in response to the input of the driver with instructions from various control systems. The vehicle integrated-control apparatus and method causes a drive control system to control the drive source and the stepped automatic transmission based on the final control target.

2. Description of the Related Art

Japanese Patent Application Publication No. JP-A-05-85228 describes a vehicle integrated-control system in which control elements are hierarchically arranged. In the described vehicle integrated-control system, during the process of converting the input of a driver into a predetermined operation mode, at least one control element at a high hierarchical level passes the signal indicating the mode down to control elements at lower hierarchical levels. The lower-level systems are instructed to establish the mode indicated by the control elements at the higher hierarchical level.

In the vehicle integrated-control system described in Japanese Patent Application Publication No. JP-A-05-85228, control systems at higher levels communicate with the control systems at lower levels in order to determine an achievable control-target-range. This avoids situations where the control target finally set by the higher-level control system cannot be achieved by the lower-level systems given the status of, for example, mechanical and control operations.

However, in vehicles including a stepped automatic transmission, the following problem may occur. If the control system at a higher level assesses the achievable control-target-range (e.g. the range of achievable engine torque) of only, for example, an engine control system, when the higher-level control system provides an instruction to achieve an engine torque included in the achievable control-target-range, the higher-level control system cannot determine whether the shift speed needs to be changed to achieve the engine torque. As a result, an instruction to perform the optimum coordination cannot be provided.

SUMMARY OF THE INVENTION

It is an object of the invention to provide a vehicle integrated-control apparatus and method that can provide control systems at upper levels with a achievable control-target range based on which the control systems at the upper levels can determine whether the shift speed of a stepped automatic transmission can be changed.

A first aspect of the invention relates to a vehicle integrated-control apparatus that is employed in a vehicle including a drive source and a stepped automatic transmission which is connected to the drive source and which changes a speed ratio in a stepwise manner; that includes multiple control systems; that sets a final control target by coordinating a control target primarily set based on an input of a driver with instruction values from the control systems; and that causes a drive control system, which is one of the control systems, to control the drive source and the stepped automatic transmission to achieve the final control target. In the vehicle integrated-control apparatus, at least one of three ranges of control targets is calculated. The three ranges include a range of control targets that can be achieved at a current shift speed; a range of control targets that can be achieved by changing the current shift speed to a currently achievable shift speed; and a range of control targets that can be achieved without changing the current shift speed to another shift speed. Then, at least one of the control systems, which provide the instruction values, is notified of the calculated range of control targets.

A second aspect of the invention relates to a control method performed by a vehicle integrated-control apparatus that is employed in a vehicle including a drive source and a stepped automatic transmission which is connected to the drive source and which changes a speed ratio in a stepwise manner, and that includes multiple control systems. The control method includes the steps of calculating at least one of three ranges of control targets, which include a range of control targets that can be achieved at a current shift speed; a range of control targets that can be achieved by changing the current shift speed to a currently achievable shift speed; and a range of control targets that can be achieved without changing the current shift speed to another shift speed; notifying at least one of the control systems, which provide the instruction values, of the calculated range of control targets; setting a final control target by coordinating a control target primarily set based on an input of a driver with instruction values from the control systems; and causing a drive control system, which is one of the control systems, to control the drive source and the stepped automatic transmission to achieve the final control target.

In each of the first and second aspects, the range of control targets that can be achieved by changing the current shift speed to a currently achievable shift speed, and at least one of the range of control targets that can be achieved at the current shift speed and the range of control targets that can be achieved without changing the current shift speed to another shift speed may be calculated. Alternatively, the range of control targets that can be achieved by changing the current shift speed to a currently achievable shift speed, the range of control targets that can be achieved at the current shift speed, and the range of control targets that can be achieved without changing the current shift speed to another shift speed may be calculated.

In each of the first and second aspects, one of the multiple control systems may provide the instruction value to be coordinated with the control target to stabilize a dynamic behavior of the vehicle. Also, the control system that is notified of the range of the control targets may set the instruction value to be coordinated with the control target in consideration of the notified range of the control targets.

With the vehicle integrated-control apparatus and method described above, it is possible to provide the control systems at upper levels with a achievable control-target range based on which the control systems at the upper levels can assess whether the shift speed of a stepped automatic transmission can be changed.

BRIEF DESCRIPTION OF THE DRAWINGS

The features of the invention and advantages thereof, as well as the technical and industrial significance of this inven

DETAILED DESCRIPTION OF THE EXAMPLE EMBODIMENT

In the following description and accompanying drawings, the present invention will be described in more detail in terms of example embodiment. First, a vehicle including a vehicle integrated-control apparatus according to the invention will be schematically described with reference to FIG. 1.

Figure 1:
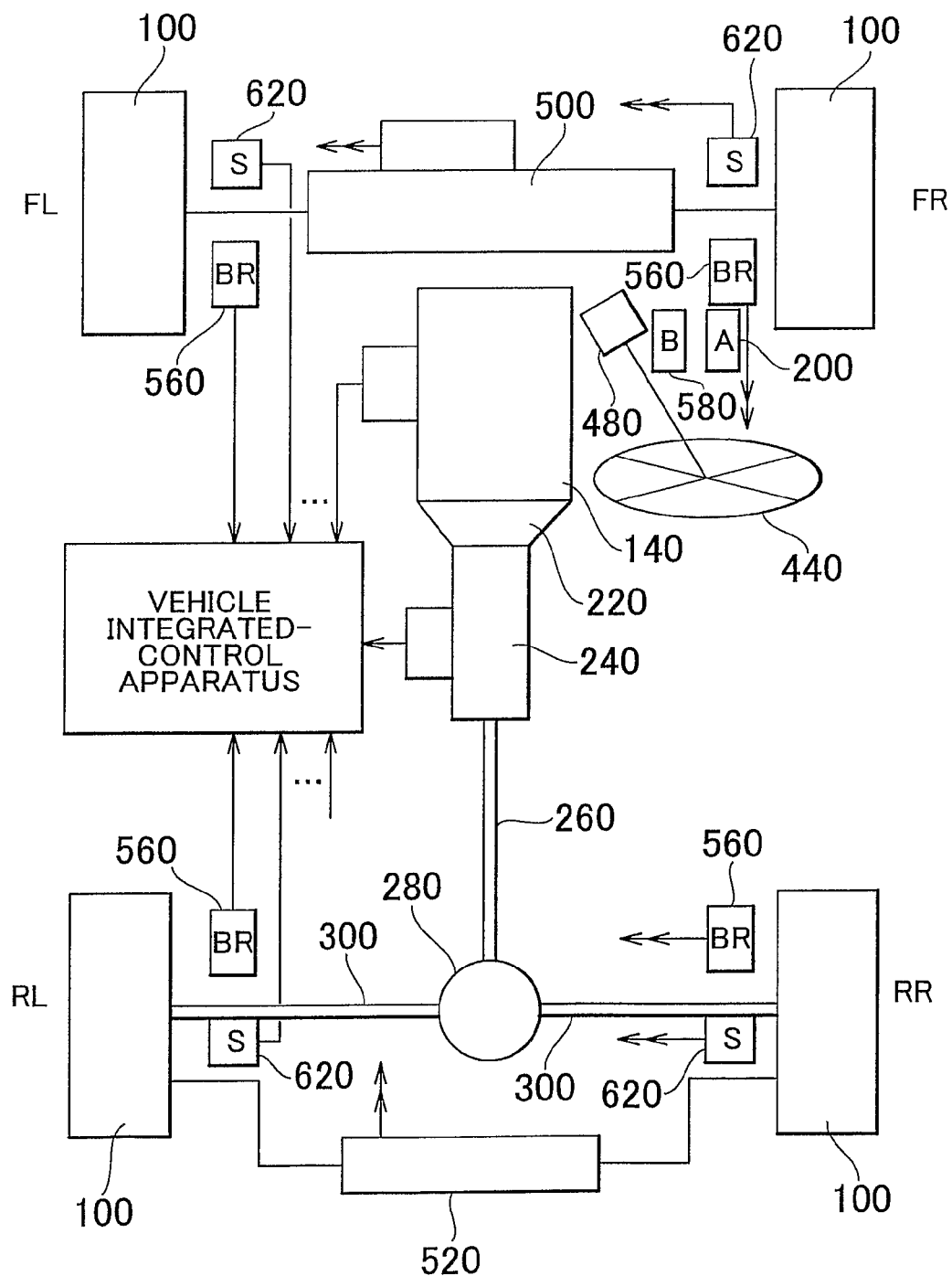
- FIG. 1 illustrates the top view a vehicle including a vehicle integrated-control apparatus according to the invention, in which a driving force control device is embedded.

The vehicle is provided with right and left front wheels 100 and right and left rear wheels 100. In FIG. 1, "FR" denotes the right front wheel, "FL" denotes the left front wheel, "RR" denotes the right rear wheel, and "RL" denotes the left rear wheel.

The vehicle includes an engine 140 as a power source. The power source is not limited to an engine. An electric motor may be used as the sole power source. Alternatively, an engine and an electric motor may be used in combination as the power source. The power source for the electric motor may be a secondary battery or a fuel cell.

The operating state of the engine 140 is electrically controlled based on the operation amount of an accelerator pedal 200 (one of the input members operated by the driver to control the forward movement, backward movement, speed, or acceleration of the vehicle) by the driver. If necessary, the operating state of the engine 140 may be automatically controlled independently of the operation of the accelerator pedal 200 by the driver.

The engine 140 is electrically controlled by electrically controlling, for example, the opening amount of a throttle valve (not shown) (hereinafter, referred to as a "throttle valve opening amount") provided in an intake manifold of the engine 140, the amount of fuel injected into a combustion chamber of the engine 140, or the angular position of an intake camshaft that adjusts the valve opening/closing timing.

The example vehicle is a rear-wheel drive vehicle where the right and left front wheels are the driven wheels and the right and left rear wheels are the drive wheels. Accordingly, the output shaft of the engine 140 is connected to the right and left rear wheels via a torque converter 220, a transmission 240, a propeller shaft 260, a differential gear unit 280, and a drive shaft 300 that rotates along with the rear wheels. The torque converter 220, the transmission 240, the propeller shaft 260, and the differential gear unit 280 are power transmission elements shared by the right and left rear wheels. However, the application of vehicle integrated-control apparatus according to the embodiment is not limited to rear-wheel drive vehicles. The vehicle integrated-control apparatus may be applied, for example, to front-wheel drive vehicles where the right and left front wheels are the drive wheels and the right and left rear wheels are the driven wheels. Also, the vehicle integrated-control apparatus may be applied to four-wheel drive vehicles where all the wheels are the drive wheels.

The transmission 240 is an automatic transmission that is connected to the engine 140 and that changes the shift speed in a stepwise manner. The automatic transmission electrically controls the speed ratio, based on which the speed of the engine 140 is converted into the rotational speed of the output shaft of the transmission 240.

The vehicle includes a steering wheel 440 operated by the driver. A steering reaction force supply device 480 electrically supplies the steering wheel 440 with a steering reaction force, that is, a reaction force corresponding to the operation of the steering wheel 440 performed by the driver (hereinafter, sometimes referred to as "steering"). The steering reaction force can be electrically controlled.

The orientation of the right and left front wheels, namely, the steering angle of the front wheels is electrically controlled by a front steering device 500. The front steering device 500 controls the steering angle of the front wheels based on the angle by which the driver has turned the steering wheel 440. If necessary, the front steering device 500 may automatically control the steering angle of the front wheels independently of the operation of the steering wheel 440 by the driver. In other words, the steering wheel 440 may be mechanically isolated from the right and left front wheels.

Similarly, the orientation of the right and left rear wheels, namely, the steering angle of the rear wheels is electrically controlled by a rear steering device 520.

The wheels 100 are provided with respective brakes 560 that are applied to suppress rotation of the wheels 100. The brakes 560 are electrically controlled based on the operation amount of a brake pedal 580 (one of the input members operated by the driver to control the forward movement, backward movement, speed, or deceleration of the vehicle) by the driver. If necessary, the wheels 100 may be individually and automatically controlled.

In the example vehicle, the wheels 100 are connected to the vehicle body (not shown) via respective suspensions 620. The suspension properties of each suspension 620 can be electrically controlled independently of the other suspensions 620.

The following actuators are used to electrically control the corresponding components described above:

(1) an actuator that electrically controls the engine 140;
(2) an actuator that electrically controls the transmission 240;
(3) an actuator that electrically controls the steering reaction force supply device 480;
(4) an actuator that electrically controls the front steering device 500;
(5) an actuator that electrically controls the rear steering device 520;
(6) actuators that electrically control the brakes 560; and
(7) actuators that electrically control the suspensions 620.

Only commonly used actuators are listed above. Whether all the actuators listed above are required depends on the specifications of the vehicles. Some vehicles do not include one or more actuators listed above. Alternatively, other vehicles may include other actuators, in addition to the actuators listed above, such as an actuator used to electrically control the ratio between the steering amount of the steering wheel 440 and the steered amount of the steered wheel (steering ratio), and an actuator used to electrically control a reaction force of the accelerator pedal 200. Accordingly, the invention is not limited to the particular actuator configurations mentioned above.

As shown in FIG. 1, the vehicle integrated-control apparatus that is mounted in the vehicle is electrically connected to the various actuators described above. A battery (not shown) serves as the electric power source for the vehicle integrated-control apparatus.

Figure 2:
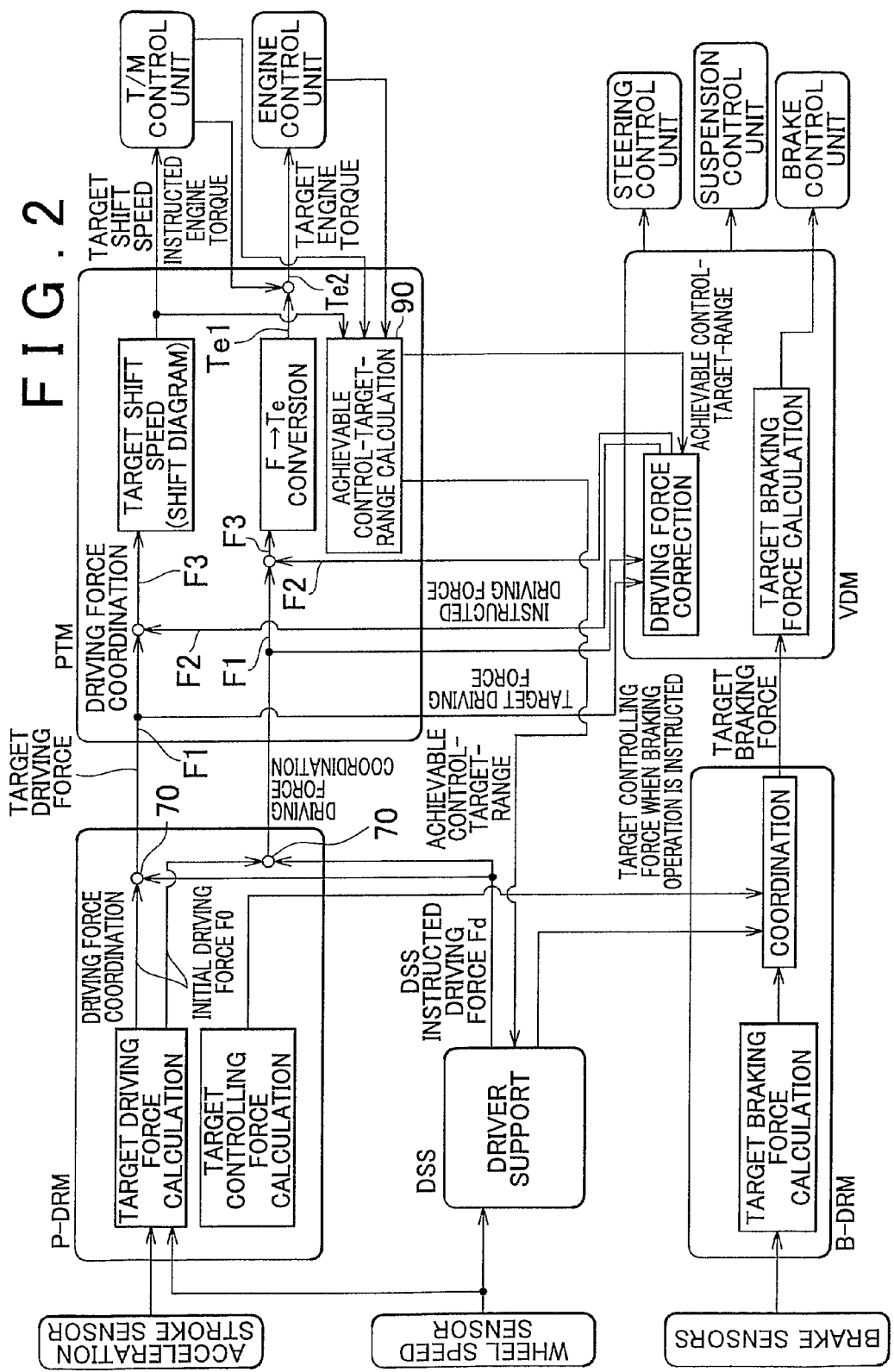
FIG. 2 illustrates the system diagram of the vehicle integrated-control apparatus according to an embodiment of the invention.

FIG. 2 illustrates the system diagram of the vehicle integrated-control apparatus according to the embodiment of the invention.

As in the case of a commonly used ECU (electronic control unit), each manager (and model) described below may be a microcomputer that includes, for example, ROM that stores control programs, RAM where results of calculations and the like are stored and the data can be retrieved and/or updated, a timer, a counter, an input interface, an output interface, and the like. In the following description, the control units are grouped by function, and referred, for example, to as a P-DRM, a VDM, and the like. However, the P-DRM, the VDM, and the like need not be configurations physically independent of each other. The P-DRM, the VDM, and the like may be configured integrally with each other using an appropriate software structure.

As shown in FIG. 2, at the highest level of the drive control system, a manager that functions as a driver's intention determining portion of the drive control system (hereinafter, referred to as a "P-DRM": Power-Train Driver Model) is arranged. At the highest level of the drive control system, a driver support system (hereinafter, referred to as a "DSS": Driver Support System) is arranged in parallel to the P-DRM.

At the level superior to the P-DRM, an acceleration stroke sensor is arranged. The acceleration stroke sensor produces an electric signal corresponding to the operation amount of the accelerator pedal 200, which directly reflects the input of the driver.

At the level superior to the DSS, wheel speed sensors are arranged. The wheel speed sensors are provided for the respective wheels 100. Each wheel speed sensor 100 outputs a pulse signal each time the wheel 100 rotates through a predetermined angle.

The P-DRM receives the signals output from the acceleration stroke sensor and the wheel speed sensors. At the highest level in the P-DRM, a target driving force calculation portion calculates an initial driving force F0 (N) based on the accelerator pedal operation amount (%) and the wheel speed No (rpm) indicated by the electric signals from the acceleration stroke sensor and the wheel speed sensors, respectively.

The initial driving force F0 may be derived in the following manner: 1) the target acceleration G (m/s$^2$) is calculated based on an appropriate three-dimensional map using the accelerator pedal operation amount (%) and the wheel speed (rpm) as parameters, 2) the target driving force is derived by converting the target acceleration G (m/s$^2$) into the physical quantity suitable for force (N), and 3) the initial driving force F0 is derived by correcting the target driving force using an uphill-slope compensation amount (N) that is determined based on running resistance (N) and a road inclination.

The signal indicating the initial driving force F0 (N) thus determined is transmitted to the control elements at the subordinate levels via two signal lines extending from the target driving force calculation portion. Hereafter, the two routes through which the signal indicating the initial driving force F0 is transmitted will be referred to as an "engine control system transmission route" and a "T/M control system transmission route". The initial driving force F0 indicated by the signal transmitted through the engine control system transmission route may be smoothed to prevent an abrupt change in driving force. However, the initial driving force F0 indicated by the signal transmitted through the T/M control system transmission route is generally not smoothed.

As shown in FIG. 2, if an instruction to correct the initial driving force F0 (N) is provided from the DSS, a coordination portion 70 coordinates the initial driving force F0 (N) with a DSS instructed driving force Fd (N) specified in the DSS instruction, in each route.

The DSS provides an appropriate instruction as an alternative to the input of the driver or an appropriate instruction to make a correction to the input of the driver, based on the information concerning obstacles located around the vehicle, which is captured, for example, by a camera or a radar, the road information and ambient area information obtained from a navigation system, the current position information obtained from a GPS positioning device of the navigation system, or various information obtained via communication with the operation center, vehicle-to-vehicle communication or road-to-vehicle communication.

For example, when the user turns the cruise control on, generally by manipulating a cruise switch provided near the steering wheel, the DSS calculates and provides an instruction indicating the DSS instructed driving force Fd (N) that is necessary to maintain a desired vehicle-to-vehicle distance (or a vehicle-to-vehicle time interval) with the preceding vehicle.

For example, in constant vehicle speed running control, the DSS calculates and provides the instruction indicating the DSS instructed driving force Fd (N) that is necessary to maintain a predetermined constant vehicle speed, based on the information concerning the vehicle speed indicated by the signal transmitted, for example, from the wheel speed sensors.

For example, in deceleration control for bringing the vehicle to stop at a stopping position, the DSS detects a stopping position ahead of the vehicle based on the information concerning obstacles located around the vehicle, the road information, the ambient area information, etc. The DSS then calculates and provides an instruction indicating the DSS instructed driving force Fd (<0) that is necessary to bring the vehicle to stop at the stopping position, if it is determined, based on the positional relationship between the stopping position and the vehicle and the manner in which the vehicle speed is reduced, that intervention-deceleration control needs to be performed.

For example, in the deceleration control that is performed to reduce the vehicle speed to an appropriate vehicle speed (vehicle speed suitable for the curvature radius of a curve, etc.) before the vehicle passes the starting point of a sharp curve, the DSS detects a stopping position ahead of the vehicle based on the information concerning obstacles around the vehicle, the road information, the ambient area information, etc. Then, the DSS calculates and provides an instruction indicating the DSS instructed driving force Fd (<0) that is necessary to reduce the vehicle speed such that it becomes an appropriate vehicle speed at the starting point of the curve before the vehicle passes the starting point, if it is determined, based on the positional relationship between the stopping position and the vehicle and manner in which the vehicle speed is reduced before the vehicle passes the starting point of the curve, that the intervention deceleration control needs to be performed.

At the coordination portion 70, for example, when the driver intends to increase or reduce the vehicle speed, a value whose absolute value is greater is selected from among the DSS instructed driving force Fd and the initial driving force F0. When the driver has no intention to increase or reduce the vehicle speed, the DSS instructed driving force Fd is selected.

Hereinafter, the target driving force (the initial driving force F0 or the DSS instructed driving force Fd) that is calculated through the coordination process performed by the coordination portion 70 will be referred to as a "target driving force F1". As shown in FIG. 2, the signal indicating the target driving force F1 (N) is transmitted to a power-train manager (hereinafter, referred to as a "PTM": Power-Train Manager). The PTM is a manager that functions as an instruction coordination portion of the drive control system.

At the highest level of the PTM, the signal indicating the target driving force F1 (N) from the P-DRM is transmitted to a manager of the dynamic behavior control system (hereinafter, referred to as a "VDM": Vehicle Dynamics Manager). The VDM is arranged at the level subordinate to a manager that functions as a driver's intention determining portion of the brake control system (hereinafter, referred to as a "B-DRM": Brake Driver Model). The VDM is a manager that functions as a vehicle movement coordination portion. Examples of such system that stabilizes the dynamic behavior of the vehicle include a traction control system (a system that suppresses unnecessary wheelspin of the drive wheels that is likely to occur when the vehicle starts or accelerates on a slippery road), a system that suppresses a side skid that is likely to occur when the vehicle enters a slippery road, a system that stabilizes the orientation of the vehicle to prevent the vehicle from spinning out or sliding off the track if the limit of stability is reached when the vehicle is going round the curve, and a system that actively makes a difference in the driving force between the right and left rear wheels of the four-wheel drive vehicle, thereby causing a yaw moment.

At the level subordinate to the VDM, a steering control unit that controls the actuators for the front steering device 500 and the rear steering device 520, and a suspension control unit that controls the actuators for the suspensions 620 are arranged in parallel with the brake control unit that controls the actuators for the brakes 560. In the B-DRM, a target braking force calculation portion converts the electric signal transmitted from a brake sensor into a signal indicating a target braking force. This signal is then transmitted via the VDM to the brake control unit. While not described in detail in this specification, the target braking force calculated by the target braking force calculation portion undergoes various correction (coordination) processes in the same or similar manner in which the target driving force F1 undergoes correction (coordination) processes, as described later in detail. Then, the signal indicating the target braking force derived after correction (coordination) is output to the brake control unit.

The target driving force F1 is primarily determined based mainly on the input of the driver. A driving force correction portion of the VDM secondarily provides an instruction to correct the target driving force F1 to stabilize the dynamic behavior of the vehicle. Namely, the driving force correction portion of the VDM provides instructions to correct the target driving force F1, if necessary. In this case, preferably, the driving force correction portion of the VDM indicates the absolute amount of the target driving force F1 that should replace the target driving force, not the correction amounts AF by which the target driving force F1 should be increased or decreased. Hereafter, the absolute amount of the target driving force indicated by the instruction from the VDM, which is derived from the target driving force F1, will be referred to as a "target driving force F2".

As shown in FIG. 2, a signal indicating the target driving force F2 is input in the PTM. As shown in FIG. 2, the signal indicating the target driving force F2 is input in each of the engine control system transmission route and the T/M control system transmission route. At the input portion of each route, the target driving force F2 is coordinated with the target driving force F1. In this coordination process, preferably, a higher priority is given to the target driving force F2 than to the target driving force F1, because a higher priority should be given to a stable dynamic behavior of the vehicle. Alternatively, the final target driving force may be derived by appropriately assigning weights to the target driving force F2 and the target driving force F1. To give a higher priority to the stable dynamic behavior of the vehicle, the greater weight is assigned to the target driving force F2 than to the target driving force F1. The target driving force derived through such coordination process will be referred to as a "target driving force F3".

In the T/M control system transmission route, the signal indicating the target driving force F3 is transmitted to a target shift speed setting portion, as shown in FIG. 2. The target shift speed setting portion sets the final target shift speed based on the predetermined shift diagram that defines the shift point based on the driving force and the wheel speed No (see FIG. 5). The final target shift speed may be set based on the predetermined shift diagram that defines the shift point of the throttle valve opening amount and the wheel speed No (see FIG. 6) after converting the target driving force F3 into the throttle valve opening amount Pa (%).

The signal indicating the target shift speed thus set in the PTM is output to the T/M control unit arranged at the level subordinate to the PTM. The T/M control unit controls the actuator for the transmission 240 to achieve the target shift speed.

In the engine control system transmission route, an "F→Te conversion portion" converts the mode of expressing the target driving force F3 from the mode where it is expressed by the driving force (N) to the mode where it is expressed by the engine torque (Nm), as shown in FIG. 2. An engine torque coordination portion coordinates a thus derived target engine torque Te1 (Nm) with the instructed engine torque (Nm) indicated by the signal transmitted from the T/M control unit to the PTM. The target engine torque derived through such coordination will be referred to as a "target engine torque Te2".

The signal indicating the target engine torque Te2 is output to the engine control unit arranged at the level subordinate to the PTM. The engine control unit and the T/M control unit control the actuator for the engine 140 to achieve the target engine torque indicated by the signal from the PTM.

According to the embodiment described so far, the target driving force F1 calculated by the target driving force calculation portion of the P-DRM undergoes various correction (coordination) processes based on the instructions from the DSS and the VDM, and the signal indicating the target driving force that has undergone various correction (coordination) processes is output to the engine control unit and the T/M control unit. These control units control the actuators for the engine 140 and the transmission 240, whereby the target driving force F1 (if the target driving force F1 has undergone the coordination process, the target driving force F2 or the target driving force F3) is achieved.

In the vehicle integrated-control apparatus described above, the control systems at higher the levels communicate with the control systems at the lower levels in order to determine achievable control-target-range. This avoids situations where the target driving force F1 (if the target driving force F1 has undergone the coordination process, the target driving force F2 or the target driving force F3) finally set by the DSS and the VDM, which are the higher-level control systems, cannot be achieved by the engine control unit and the T/M control unit, which are the lower-level control systems.

Therefore, according to the embodiment, as shown in FIG. 2, an achievable control-target-range calculation portion 90 is arranged in the PTM.

Hereafter, the achievable control-target-range calculation portion 90, which is the characterizing portion of the embodiment, will be described in detail with reference to FIGS. 2 and 3.

The achievable control-target-range calculation portion 90 calculates three achievable control-target-ranges, that are, the range of the target driving force that can be obtained at the current shift speed, the range of the target driving force that can be obtained by changing the current shift speed to a currently achievable shift speed, and the range of the driving force that can be obtained without changing the current shift speed to another shift speed.

Figure 3:
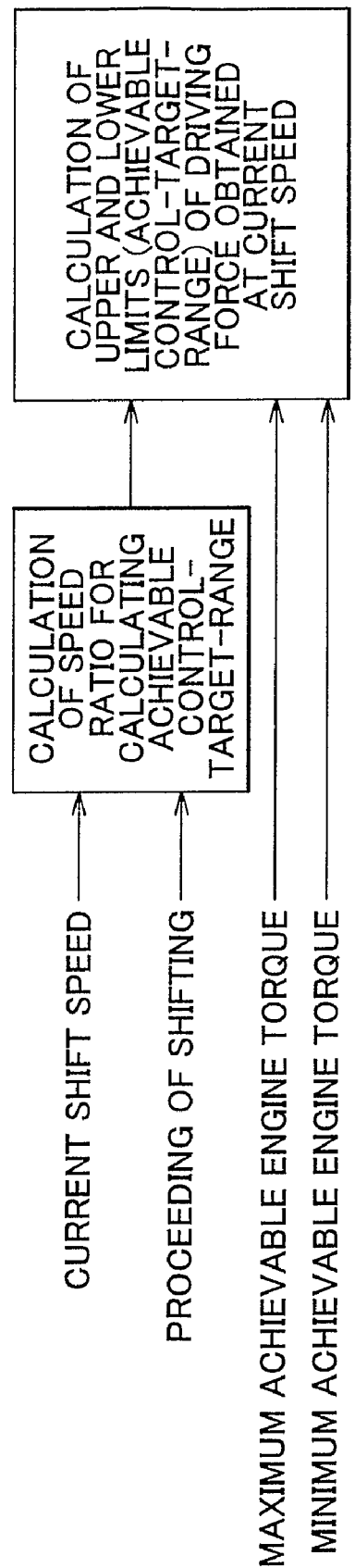
FIG. 3 illustrates the block diagram showing a method for calculating the first achievable control-target-range, that is, the "range of target driving force that can be obtained at the current shift speed"

FIG. 3 illustrates the block diagram showing the method for calculating the first achievable control-target-range, that is, the "range of the target driving force that can be obtained at the current shift speed".

As shown in FIG. 3, the achievable control-target-range calculation portion 90 calculates the speed ratio for calculating the achievable control-target-range based on the current shift speed and the proceeding of shifting. The speed ratio for calculating the achievable control-target-range is set based, basically, on a shift command (namely, the target shift speed that is set by the target shift speed setting portion and output to the T/M control unit, as described above). However, during shifting, the speed ratio at the shift speed, which is achieved before shifting is started, is used as the speed ratio for calculating the achievable control-target-range until the inertia phase, where the rotational speed changes, starts. After the inertia phase starts, the speed ratio at the shift speed, which is achieved after shifting ends, is used as the speed ratio for calculating the achievable control-target-range.

The achievable control-target-range calculation portion 90 further calculates a maximum achievable engine torque $Te_{max}$ and a minimum achievable engine torque $Te_{min}$. The achievable control-target-range calculation portion 90 calculates a first achievable control-target-range, that is, the upper limit and the lower limit of the target driving force that can be obtained at the current shift speed, using the maximum achievable engine torque $Te_{max}$ and the minimum achievable engine torque $Te_{min}$, and the speed ratio for calculating the achievable control-target-range. The maximum achievable engine torque $Te_{max}$ corresponds to the engine torque that can be achieved when the throttle valve opening amount is 100%, that is, when the throttle valve is fully open. The maximum achievable engine torque $Te_{max}$ may be calculated using the rotational speed of the engine 140 (engine speed), the intake air amount, and the ignition timing as parameters. The minimum achievable engine torque $Te_{min}$ corresponds to the engine torque that can be achieved when the throttle valve opening amount is 0%, that is, when the throttle valve is fully closed. The minimum achievable engine torque $Te_{min}$ may be calculated using the target engine speed and friction during idling time of the engine 140 as parameters.

Figure 4:
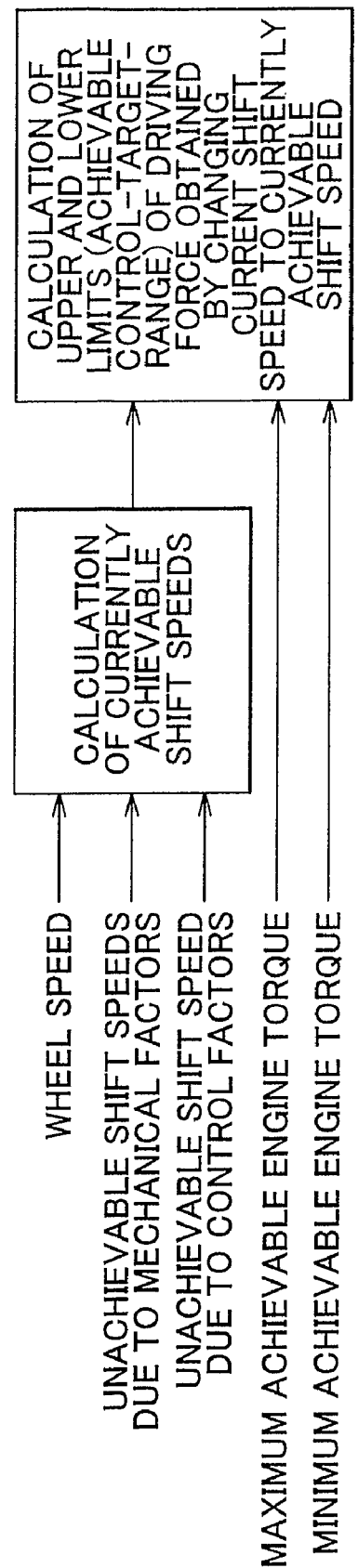
FIG. 4 illustrates the block diagram showing a method for calculating the second achievable control-target-range, that is, the "range of target driving force that can be obtained by changing the current shift speed to a currently achievable shift speed.

FIG. 4 illustrates the block diagram showing the method for calculating a second achievable control-target-range, that is, the "range of the target driving force that can be obtained by changing the current shift speed to a currently achievable shift speed".

As shown in FIG. 4, the achievable control-target-range calculation portion 90 calculates the currently achievable shift speeds, based on the vehicle speed, currently unachievable shift speeds determined based on the mechanical factors, and currently unachievable shift speeds determined based on the control factors. The unachievable shift speeds determined based on the mechanical factors correspond, for example, to the shift speeds that are determined to be unachievable based on the mechanical constraints of the propeller shaft 260, the differential unit 280, etc. Also, the unachievable shift speeds determined based on the control factors correspond, for example, to the shift speeds that are determined to be unachievable due to the constraints for preventing over-run of the engine 140. For example, if shifting from fourth speed to third speed or second speed cannot be performed at a vehicle speed equal to or higher than a predetermined vehicle speed, third speed and second speed correspond to the unachievable shift speeds. Accordingly, the currently achievable shift speeds signify the range of the shift speeds that are considered to be achievable by changing the current shift speed in consideration of the constraints (unachievable shift speeds).

The achievable control-target-range calculation portion 90 calculates the second achievable control-target-range, that is, the upper limit and the lower limit of the target driving force that can be obtained by changing the current shift speed to a currently achievable shift speed, using the maximum achievable engine torque $Te_{max}$, the minimum achievable engine torque $Te_{min}$, and the currently achievable shift speeds.

Figure 5:
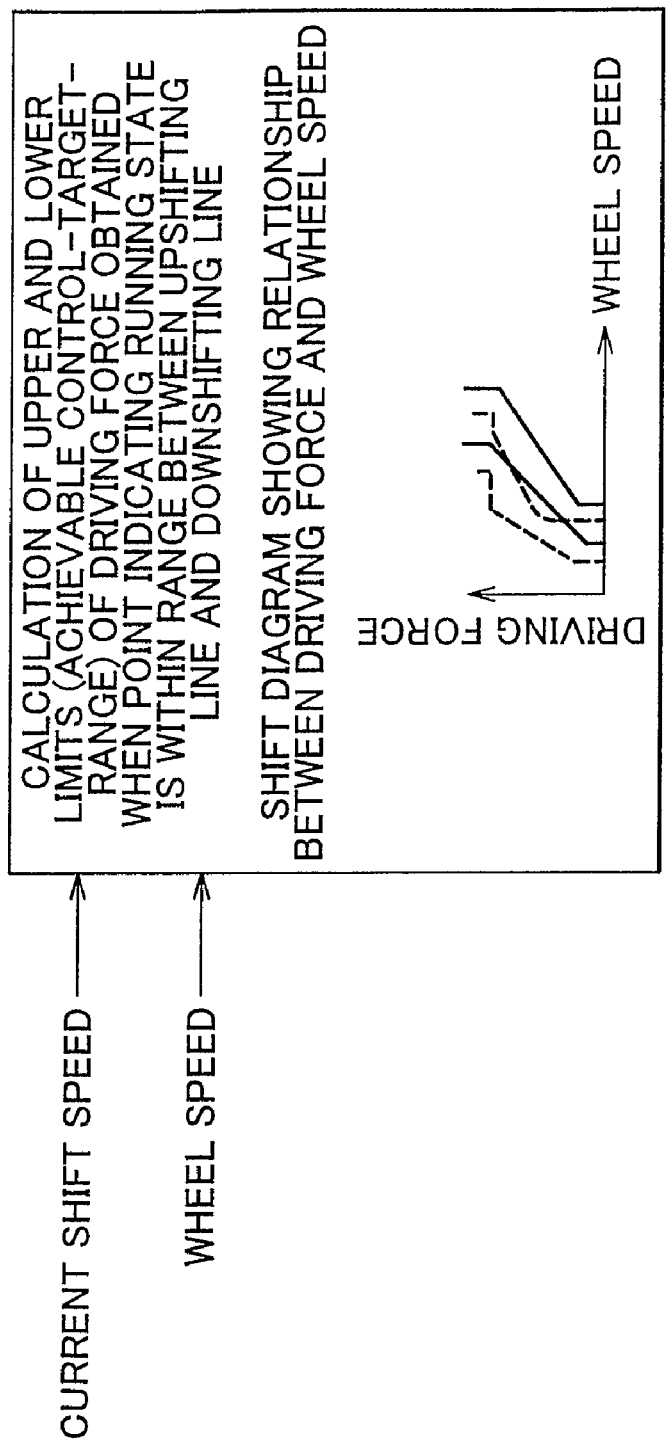
FIG. 5 illustrates the first block diagram showing a method for calculating the third achievable control-target-range, that is, the "range of the target driving force that can be obtained without changing the current shift speed to another shift speed"

FIG. 5 illustrates the block diagram showing a method for calculating a third achievable control-target-range, that is, the "range of the target driving force that can be obtained without changing the current shift speed to another shift speed". In this case, the shift diagram, which defines the shift point based on the driving force and the wheel speed No, is used by the target shift speed setting portion. In the shift diagram schematically shown in FIG. 5, solid lines indicate upshifting, and dashed lines indicate downshifting.

As shown in FIG. 5, the achievable control-target-range calculation portion 90 calculates the third achievable control-target-range, that is, the upper limit and the lower limit of the driving force, which can be obtained when the point indicating the running state is within the range between the upshifting line and the downshifting line, based on the current shift speed and wheel speed.

Figure 6:
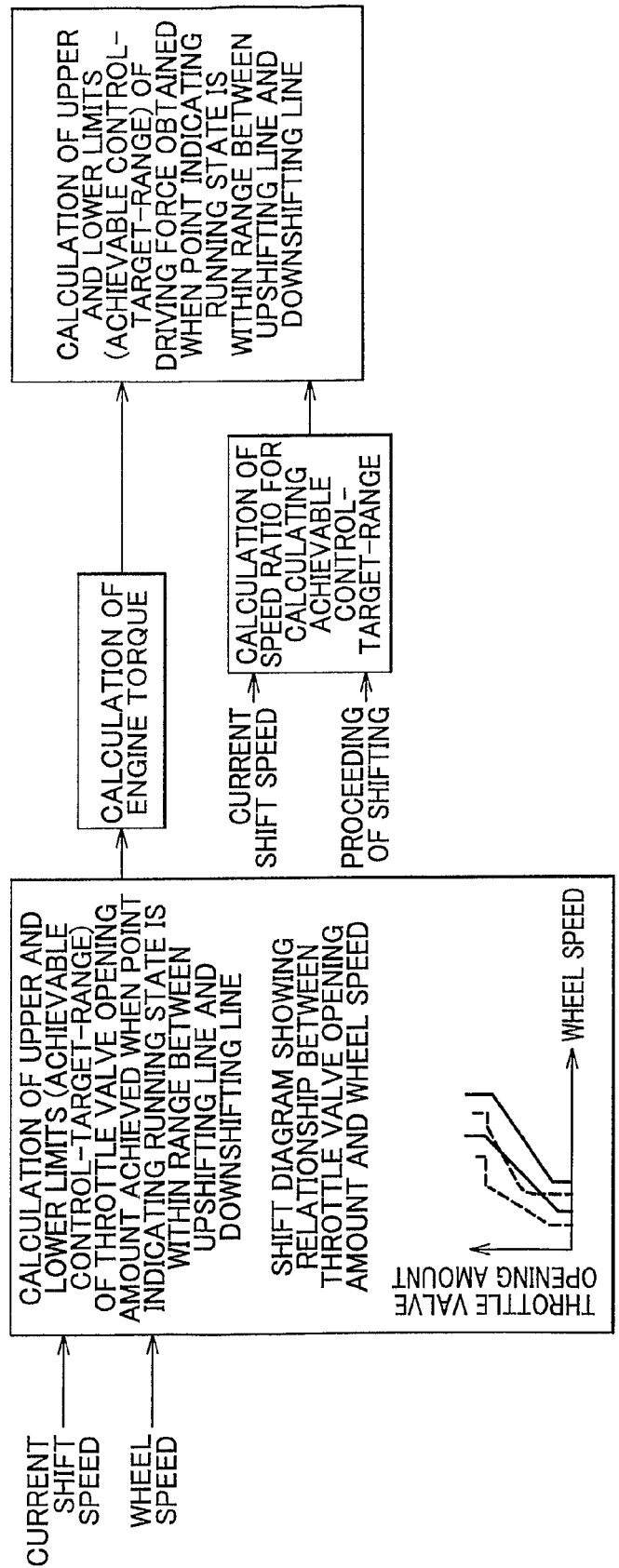
FIG. 6 illustrates the second block diagram showing a method for calculating the third achievable control-target-range, that is, the "range of target driving force that can be obtained without changing the current shift speed to another shift speed.

FIG. 6 illustrates the block diagram showing the method for calculating the third achievable control-target-range, that is, the "range of the target driving force that can be obtained without changing the current shift speed to another shift speed". In this case, the shift diagram, which defines the shift point based on the throttle valve opening amount and the wheel speed No, is used by the target shift speed setting portion. In the shift diagram schematically shown in FIG. 6, the solid lines indicate upshifting, and the dashed lines indicate downshifting.

As shown in FIG. 6, the achievable control-target-range calculation portion 90 calculates the upper limit and the lower limit of the throttle valve opening amount, which can be achieved when the point indicating the running state is within the range between the upshifting line and the downshifting line, based on the current shift speed and wheel speed. The upper limit and the lower limit of the engine torque corresponding to the throttle valve opening amount are calculated using the upper limit and the lower limit of the throttle valve opening amount. Such upper limit and lower limit of the engine torque may be the upper limit and the lower limit of the engine torque that can be achieved when point indicating the running state is within the range between the upshifting line and the downshifting line. The upper limit and the lower limit of the engine torque may be calculated in consideration of the rotational speed of the engine 140, the intake air amount, and the ignition timing, as in the calculation of the maximum achievable engine torque $Te_{max}$.

The achievable control-target-range calculation portion 90 calculates the speed ratio for calculating the achievable control-target-range based on the current shift speed and the proceeding of shifting. The speed ratio for calculating the achievable control-target-range is set based, basically, on a shift command (namely, the target shift speed set by the target shift speed setting portion and output to the T/M control unit, as described above). During shifting, before the inertia phase where the rotational speed changes starts, the speed ratio at the shift speed achieved before shifting starts is used as the speed ratio for calculating the achievable control-target-range. After the inertia phase starts, the speed ratio at the shift speed achieved after shifting ends is used as the speed ratio for calculating the achievable control-target-range.

The achievable control-target-range calculation portion 90 calculates the third achievable control-target-range, that is, the upper limit and the lower limit of the driving force, which can be obtained when the point indicating the running state is within the range between the upshifting line and the downshifting line, based on the speed ratio for calculating the achievable control-target-range, and the upper limit and the lower limit of the engine torque.

The signals indicating the achievable control-target-ranges thus calculated by the achievable control-target-range calculation portion 90 are transmitted to the control systems that provide instructions to correct the target driving force F1 calculated by the target driving force calculation portion of the P-DRM. In the embodiment, the signals are transmitted to the DSS and the VDM, as shown in FIG. 2. The signals indicating the achievable control-target-ranges may be transmitted each time the achievable control-target-ranges are calculated (the signals may be transmitted in real time and need not be transmitted synchronously with the target driving force F1). At this time, a signal indicating all the three types of achievable control-target-ranges described above may be transmitted to the DSS and the VDM.

Thus, the DSS and the VDM that have received the signals indicating the achievable control-target-ranges can determine whether the shift speed will be changed due to the instruction as well as whether the received instruction (the DSS instructed driving force Fd and the target driving force F2) can be realized, by referring to the achievable control-target-ranges indicated by the signals. Therefore, the DSS and the VDM can correct the instructions from each system and output the corrected instructions in consideration of the shifting by the stepped automatic transmission 240. This means that the options of the instructions from the DSS and the VDM increase. For example, when the VDM determines that, although the target driving force F2 should be obtained to stabilize the dynamic behavior of the vehicle, the target driving force F2 need not be obtained at the present under the condition where the shift speed needs to be changed (or when the VDM determines that a change in the shift speed adversely affects the stable dynamic behavior of the vehicle), the upper limit (or the lower limit) of the first achievable control-target-range may be used as the instruction value, instead of the target driving force F2. When it is determined, by referring to the third achievable control-target-range, that the shift speed will be changed due to the target driving force F2 currently instructed, if it is determined that the target driving force F2 need not be obtained at the present stage under the condition where the shift speed needs to be changed (or when it is determined that a change in the shift speed will adversely affect the stable dynamic behavior of the vehicle), the upper limit (or the lower limit) of the third achievable control-target-range may be used as the instruction value, instead of the target driving force F2. On the other hand, when the VDM determines that the target driving force F2 needs to be obtained even if a change in the shift speed is necessary, a signal indicating the target driving force F2 may be output, as the instruction value, to the PTM without any correction, on the precondition that the target driving force F2 is within the second achievable control-target-range. The fact that it is possible to determine whether such a change in the shift speed occurs is considerably effective particularly for the VDM, because the dynamic stability of the vehicle can be controlled in consideration of the influence of the dynamic behavior of the vehicle due to shifting.

The embodiment of the invention that has been described in the specification is to be considered in all respects as illustrative and not restrictive. The technical scope of the invention is defined by claims, and all changes which come within the meaning and range of equivalency of the claims are therefore intended to be embraced therein.

For example, in the embodiment described above, instructions from the DSS and the VDM are provided and coordination of the instructions from the DSS and the VDM are performed using the unit for driving force (unit of force), because the DSS and the VDM are basically the systems that control driving force. Accordingly, the achievable control-target-range is expressed by the unit of driving force. However, unit of physical quantity for the achievable control-target-range is not limited to the unit of driving force. For example, when instructions from the DSS and the VDM are provided and coordination of the instruction from the DSS and the VDM are performed using the unit of, for example, one of acceleration/deceleration, engine torque and throttle valve opening amount, the unit of physical quantity for the achievable control-target-range may be changed to the unit of the one of acceleration/deceleration, engine torque, and throttle valve opening amount.

In the embodiment described above, the engine 140 includes an electronic throttle valve, and is used as the power source. However, the invention may be applied to a configuration where the motor without an electronic throttle valve is used as the power source.

The invention claimed is:

1. A vehicle integrated-control apparatus that is employed in a vehicle including a drive source and a stepped automatic transmission which is connected to the drive source and which changes a speed ratio in a stepwise manner; that includes multiple control systems; that sets a final control target by coordinating a control target primarily set based on an input of a driver with instruction values from the control systems; and that causes a drive control system, which is one of the control systems, to control the drive source and the stepped automatic transmission to achieve the final control target, the vehicle integrated-control apparatus comprising:

a controller that calculates at least one of three ranges of control targets, which include:
a first range of control targets that can be achieved at a current shift speed;

a second range of control targets that can be achieved by changing the current shift speed to a currently achievable shift speed; and a third range of control targets that can be achieved without changing the current shift speed to another shift speed; wherein, the controller is configured to notify at least one of the control systems, which provide the instruction values, of the calculated range of control targets, and the controller is configured to transmit the at least one of three ranges of control targets as a signal to at least one of the control systems in real-time as shift speed and wheel speed change.

2. The vehicle integrated-control apparatus according to claim 1, wherein the controller calculates the second range of control targets that can be achieved by changing the current shift speed to a currently achievable shift speed, and at least one of the first range of control targets that can be achieved at the current shift speed and the third range of control targets that can be achieved without changing the current shift speed to another shift speed.

3. The vehicle integrated-control apparatus according to claim 2, wherein the control system that is notified of the at least one of three ranges of control targets sets the instruction value to be coordinated with the control target in consideration of the notified range of the control targets.

4. The vehicle integrated-control apparatus according to claim 1, wherein the controller calculates the second range of control targets that can be achieved by changing the current shift speed to a currently achievable shift speed, the first range of control targets that can be achieved at the current shift speed, and the third range of control targets that can be achieved without changing the current shift speed to another shift speed.

5. The vehicle integrated-control apparatus according to claim 4, wherein the control system that is notified of the at least one of three ranges of control targets sets the instruction value to be coordinated with the control target in consideration of the notified range of the control targets.

6. The vehicle integrated-control apparatus according to claim 1, wherein one of the multiple control systems provides the instruction value to be coordinated with the control target to stabilize a dynamic behavior of the vehicle.

7. The vehicle integrated-control apparatus according to claim 1, wherein the control system that is notified of the at least one of three ranges of control targets sets the instruction value to be coordinated with the control target in consideration of the notified range of the control targets.

8. A control method performed by a vehicle integrated-control apparatus that is employed in a vehicle including a drive source and a stepped automatic transmission which is connected to the drive source and which changes a speed ratio in a stepwise manner, and that includes multiple control systems, the control method comprising:

calculating at least one of three ranges of control targets, which include:
a first range of control targets that can be achieved at a current shift speed;
a second range of control targets that can be achieved by changing the current shift speed to a currently achievable shift speed; and
a third range of control targets that can be achieved without changing the current shift speed to another shift speed;

notifying at least one of the control systems, which provide the instruction values, of the calculated range of control targets;

transmitting the at least one of three ranges of control targets as a signal to at least one of the control systems in real-time as shift speed and wheel speed change;

setting a final control target by coordinating a control target primarily set based on an input of a driver with instruction values from the control systems; and causing a drive control system, which is one of the control systems, to control the drive source and the stepped automatic transmission to achieve the final control target.

9. The control method according to claim 8, further comprising:

calculating the second range of control targets that can be achieved by changing the current shift speed to a currently achievable shift speed, and at least one of the first range of control targets that can be achieved at the current shift speed and the third range of control targets that can be achieved without changing the current shift speed to another shift speed.

10. The control method according to 9, further comprising:

setting the instruction value to be coordinated with the control target in consideration of the notified range of the control targets.

11. The control method according to claim 8 further comprising:

calculating the second range of control targets that can be achieved by changing the current shift speed to a currently achievable shift speed, the first range of control targets that can be achieved at the current shift speed, and the third range of control targets that can be achieved without changing the current shift speed to another shift speed.

12. The control method according to claim 11, further comprising:

setting the instruction value to be coordinated with the control target in consideration of the notified range of the control targets.

13. The control method according to claim 8, further comprising:

setting the instruction value to be coordinated with the control target in consideration of the notified range of the control targets.

* * * * *